(12) United States Patent
Adams et al.

(10) Patent No.: US 10,628,606 B2
(45) Date of Patent: Apr. 21, 2020

(54) ELECTRONIC DEVICE INCLUDING DISPLAY AND METHOD OF PROVIDING PRIVATE INFORMATION

(71) Applicant: BlackBerry Limited, Waterloo (CA)

(72) Inventors: Neil Patrick Adams, Waterloo (CA); Kristof Takacs, Waterloo (CA)

(73) Assignee: BlackBerry Limited, Waterloo (CA)

( * ) Notice: Subject to any disclaimer, the term of this patent is extended or adjusted under 35 U.S.C. 154(b) by 150 days.

(21) Appl. No.: 15/702,398

(22) Filed: Sep. 12, 2017

(65) Prior Publication Data

US 2019/0080112 A1    Mar. 14, 2019

(51) Int. Cl.
| | | |
|---|---|---|
| *G06F 21/62* | (2013.01) | |
| *G06F 21/84* | (2013.01) | |
| *G06F 3/0481* | (2013.01) | |
| *G06F 21/82* | (2013.01) | |
| *G06F 21/32* | (2013.01) | |
| *G06F 21/36* | (2013.01) | |
| *G06F 3/0482* | (2013.01) | |

(52) U.S. Cl.
CPC ........ *G06F 21/6245* (2013.01); *G06F 3/0481* (2013.01); *G06F 3/0482* (2013.01); *G06F 21/32* (2013.01); *G06F 21/36* (2013.01); *G06F 21/6263* (2013.01); *G06F 21/82* (2013.01); *G06F 21/84* (2013.01)

(58) Field of Classification Search
CPC .... G06F 21/6245; G06F 3/0482; G06F 21/36; G06F 21/82
See application file for complete search history.

(56) References Cited

U.S. PATENT DOCUMENTS

| | | |
|---|---|---|
| 2005/0071188 A1 | 3/2005 | Thuerk |
| 2009/0172539 A1 | 7/2009 | Bates et al. |
| 2012/0131471 A1 | 5/2012 | Terlouw et al. |
| 2014/0253412 A1 | 9/2014 | Blaich et al. |
| 2015/0026816 A1 | 1/2015 | Gao et al. |
| 2015/0062158 A1 | 3/2015 | Hildreth et al. |
| 2016/0148015 A1 | 5/2016 | Weast et al. |
| 2016/0225337 A1* | 8/2016 | Ek .......................... G09G 5/003 |
| 2017/0255786 A1* | 9/2017 | Krishnamurthi ........ G06F 3/013 |
| 2018/0107839 A1 | 4/2018 | Clement et al. |
| 2018/0329584 A1 | 11/2018 | Williams et al. |

OTHER PUBLICATIONS

U.S. Appl. No. 15/702,404, First Non-Final Office Action dated Feb. 7, 2019.

(Continued)

*Primary Examiner* — Ellen Tran
(74) *Attorney, Agent, or Firm* — Borden Ladner Gervais LLP; Todd Keeler

(57) ABSTRACT

A method of providing private information on a display of an electronic device, includes identifying private information for display on the display of the electronic device, identifying attributes for display of the private information, displaying the private information utilizing the attributes identified, and during displaying the private information utilizing the attributes identified, displaying additional information utilizing alternate attributes that differ from the attributes identified for the private information.

18 Claims, 4 Drawing Sheets

(56) References Cited

OTHER PUBLICATIONS

European Patent Application No. 18190921.9, Extended European Search Report dated Oct. 1, 2018.
European Patent Application No. 18190925.0, Extended European Search Report dated Oct. 16, 2018.
U.S. Appl. No. 15/702,404, Final Office Action dated Aug. 8, 2019.
U.S. Appl. No. 15/702,404, Non-Final Office Action dated Dec. 2, 2019.
U.S. Appl. No. 15/702,404, Advisory Action dated Nov. 1, 2019.
European Patent Application No. 18190925.0, Office Action dated Oct. 23, 2019.

* cited by examiner

ELECTRONIC DEVICE INCLUDING DISPLAY AND METHOD OF PROVIDING PRIVATE INFORMATION

FIELD OF TECHNOLOGY

The present disclosure relates to private information for display on an electronic device.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Such electronic devices are often able to display various types of information to a user. In some situations, protection of the information displayed to inhibit viewing by others near the electronic device that is displaying the information is desirable. Software display privacy filters, which operate to reduce the visibility of the information displayed on a device display, may operate to protect the displayed content from viewing by others near the device.

Improvements in protection of such information are desirable.

BRIEF DESCRIPTION OF THE DRAWINGS

Embodiments of the present disclosure will now be described, by way of example only, with reference to the attached figures, in which.

DETAILED DESCRIPTION

Figure 1:
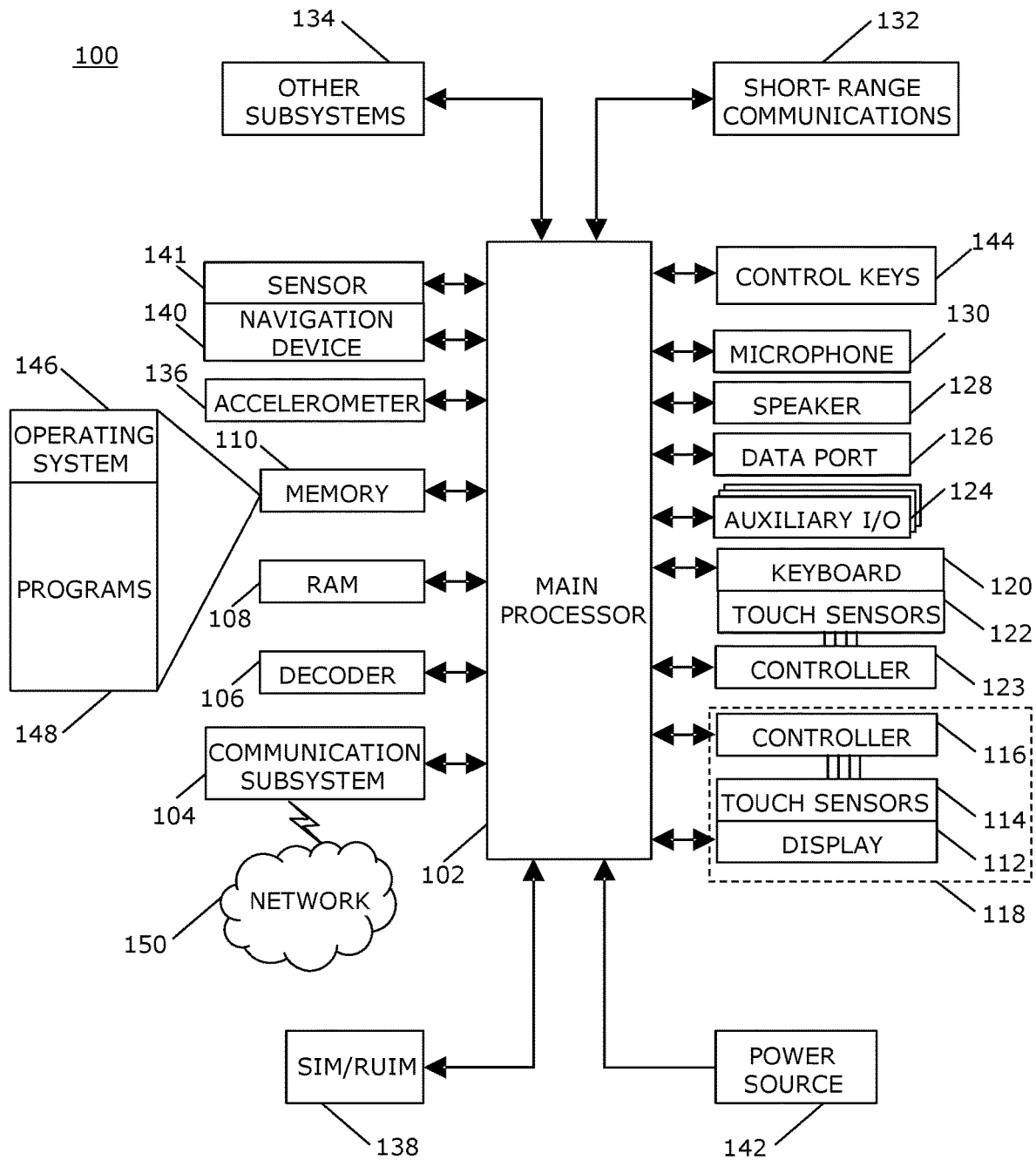
FIG. 1 is a block diagram of a portable electronic device in accordance with the present disclosure.

The following describes an electronic device including a display and a method of providing private information on the display of the electronic device. The method includes identifying private information for display on the display of the electronic device, identifying attributes for display of the private information, displaying the private information utilizing the attributes identified, and during displaying the private information utilizing the attributes identified, displaying additional information utilizing alternate attributes that differ from the attributes identified for the private information.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

A block diagram of one example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. In addition, the keys of the keyboard may include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

The processor 102 may also interacts with control keys 144 and, optionally, a navigation device 140. The control keys 144 may include, for example, a send key, a menu key, an escape key, an end key, or any other suitable control keys. The navigation device 140 may be a touch-sensitive track pad, an optical joystick, or any other suitable navigation device to interface with a user to provide input. The navigation device 140 may be utilized, for example, to navigate or scroll through information on a display, control a cursor or other indicator, edit information, and so forth.

The processor 102 may also interacts with a biometric sensor 141 for obtaining data to authenticate a user. The biometric sensor 141 may be a fingerprint sensor disposed on the navigation device for detecting a touch thereon and obtaining fingerprint data upon receipt of a touch on the navigation device. Other biometric sensors may also be successfully implemented. For example, an iris scanner or other suitable detector may be utilized for the purpose of authenticating a user.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

As indicated above, the biometric sensor 141 may be a fingerprint sensor disposed on the navigation device 140 for detecting a touch thereon and obtaining fingerprint data upon receipt of a touch on the navigation device. The fingerprint sensor may include a plurality of transmit and receive electrodes that are disposed in a grid pattern. The transmit electrodes are very closely spaced and receive electrodes are very closely spaced relative to the electrodes of the touch-sensitive display, for example, to provide a very fine grid pattern. The fine grid pattern provides very fine resolution suitable for identifying a fingerprint pattern and for detecting conductivity of ridges and valleys in a fingerprint.

Optionally, the navigation device 140 may be utilized to detect the presence of a finger on the biometric sensor 141 and, in response, the biometric sensor 141 may obtain fingerprint data for authentication purposes.

In an alternative example, the biometric sensor 141 may be an iris scanner. A navigation device in the form of an eye tracking device, for tracking movement of the eyes may be utilized for navigation. The eye tracking device may also be operable to scan the retina of an eye such that the biometric sensing may be carried out during navigation.

In still another alternative, the biometric sensor may be a voice recognition device. Navigation may be carried out by voice commands that may also be utilized for voice recognition to authenticate a user.

The processor 102 receives the biometric data from the sensor 141 and compares the biometric data to biometric data stored, for example, in memory 136 to authenticate a user. A match or at least partial match of the biometric data from the sensor 141 results in authentication. The biometric data may therefore be utilized, for example, to unlock the electronic device 100, to access applications, documents, or information on the electronic device 100, or for any other suitable purpose.

Figure 2:
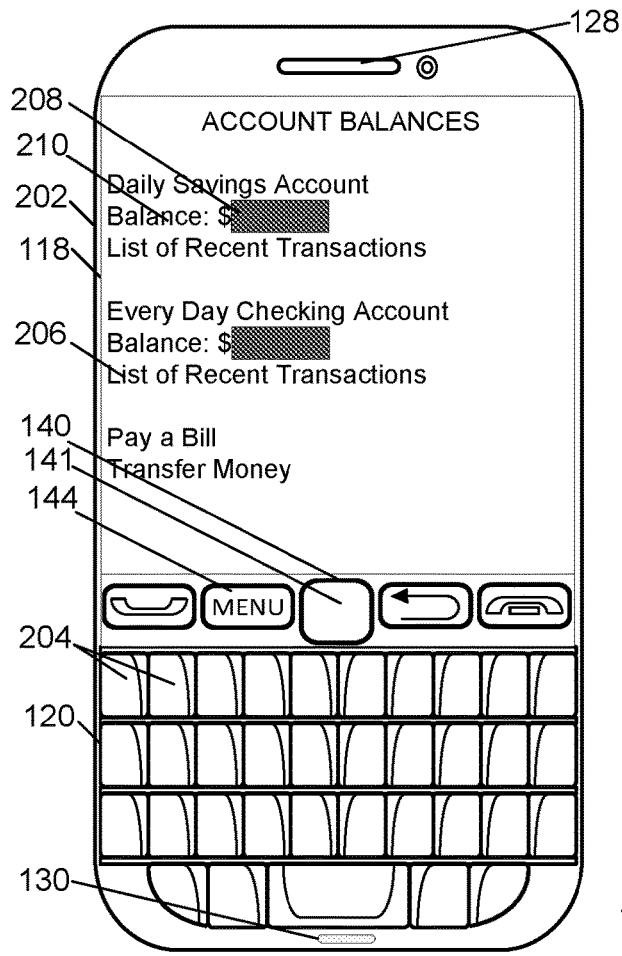
FIG. 2 is a front view of an example of an electronic device in accordance with the present disclosure.

An example of an electronic device displaying information including private information is shown in FIG. 2. In the present example, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2 through FIG. 5.

The mechanical keyboard 120 includes a plurality of keys 204. Each of the keys 204 of the keyboard 120 is associated with a character such that a character is entered utilizing a key 204. The keyboard 120 in the present example, includes four rows of keys 204 other numbers of rows of keys may be implemented, however.

The control keys 144 in this example are generally aligned in a row disposed between the touch-sensitive display 118 and the keyboard 120. In this example, the control keys include a send key, a menu key, an escape key, and an end key. Other suitable control keys can be utilized, however.

The navigation device 140 is disposed in the center of the row of control keys 144. For the purpose of the present example, the navigation device 140 is an optical joystick for user input. The biometric sensor 141 may be disposed on the navigation device 140 to facilitate authentication of a user during use of the navigation device 140. Thus, as a user utilizes the navigation device 140, for example, for scrolling or to control a cursor, the biometric sensor 141 provides data to the processor 102 (shown in FIG. 1) for authentication of the user.

Because the biometric sensor 141 is located on the navigation device 140, the navigation device may be utilized to detect a touch by detecting the presence of a finger or thumb of a user and, in response to detecting the presence of a finger or thumb, the biometric sensor 141 begins sensing to obtain fingerprint data. Thus, the navigation device 140 facilitates selective use of the biometric sensor 141 such that the biometric sensor is not continually attempting to obtain fingerprint data even in the absence of a finger or thumb on the navigation device 140, thus reducing power use.

The speaker 128 and the microphone 130 are disposed in openings in the housing 202. As indicated above, the speaker 128 outputs audible information and the microphone 130 is utilized to convert audible information into electrical signals for processing.

For the purpose of the example of FIG. 2, information received 206 is displayed on the touch-sensitive display 118. The information displayed may include any suitable information such as icons, text, pictures, video, documents, a webpage, or any other suitable information. The information may be associated with, for example, a home page, a menu or submenu, an application or applications, a webpage, and so forth.

The information received 206 in the example of FIG. 2 includes banking information. The present application is directed to providing any suitable private information on a display. The banking information includes private information 208, as well as other information 210 for display on the touch-sensitive display 118. The private information 208 is displayed such that the private information 208 is unreadable. In this example, the private information is blacked out such that the private information 208 is not discernible by the user or any other person viewing the touch-sensitive display 118, such as a person looking over the shoulder of the user. The other information 210 is not private and may be readily discernible by any person viewing the touch-sensitive display 118.

The information may, alternatively, be any suitable information associated with an application on the electronic device 100, including information received via an internet connection, such as credit card information, a credit report, a password, a user name, information associated with a group, or any other suitable information. The information may also be information or content created or composed on the electronic device 100, such as a document, message, or other information stored in memory 110, or composed utilizing the keyboard 120.

Figure 3:
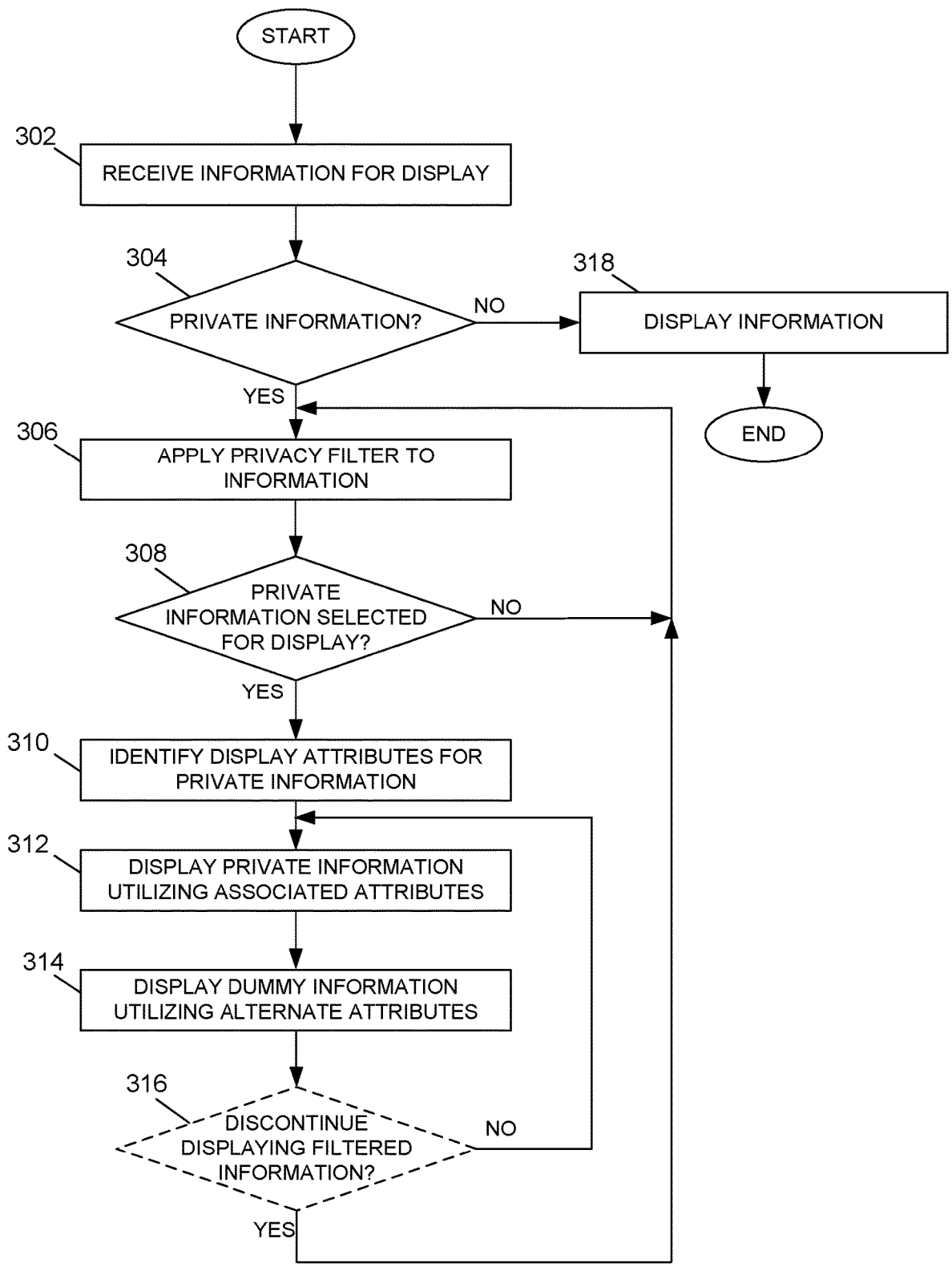
FIG. 3 is a flowchart illustrating a method of providing private information in accordance with the present disclosure.

A flowchart illustrating a method of providing private information on a display of an electronic device, such as the portable electronic device 100, is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

Information is received for displaying on the display 112 at 302. The information may include text, characters, symbols, images, icons, and other items that may be displayed or rendered on a portable electronic device 100 in association with an application executed by the processor 102, such as, for example, an electronic mail, calendar, address book, word processor, Web browser, or any other suitable application. The information may be information received from another electronic device in communication with the electronic device 100, may be information stored on the electronic device 100 and thus received at the processor 102 from memory such as the memory 110, information received at the processor 102 from an input device such as the keyboard 120, for example, during composition of a document, message, note, or any other suitable information.

A determination is made whether any of the information received is private information at 304 prior to displaying any of the information. Information may be determined to be private based on any suitable criteria. For example, parts of the information received from a sender may be flagged as private. In one example, a classification may be associated with the information received at 602. The classification may include, for example, unclassified, private, or top secret. Other classifications may also be utilized. The classifications may be utilized to determine whether or not information is private.

Optionally, the electronic device 100 or the application running on the electronic device may determine that information is private. For example, information may be identified as private because the information requires a password for display. Optionally, user names, passwords, or both may automatically be identified as private by the electronic device 100.

Alternatively, a user may flag information as private. Optionally, information may be identified as private in response to receipt of a command input by a user. In a specific example, a particular swipe gesture may be utilized to identify information as private. For example, a multi touch vertical swipe beginning on information may be utilized to identify information as private.

In response to determining that the information does not include private information at 304, the information is displayed at 318.

In response to determining that the information includes private information, the information is displayed with the private information obscured such that the private information is unreadable at 306. Thus, a privacy filter is applied at 306 to the information identified as private such that the private information is not discernable. The private information may be, for example, covered. Alternatively, the private information may be displayed with a background darkness, contrast level of the information, blur effect, darkness, or any combination thereof such that the private information is unreadable.

The unreadable private information is selectable to display the information. For example, the private information may be selected by a touch on the touch-sensitive display 118, at a location associated with the private information. Alternatively, the private information may be selected utilizing the navigation device 140 and a pointer or cursor, utilizing the touch sensors 122 of the keyboard 120, by a gesture on the touch-sensitive display 118 or the keyboard 120, or in any other suitable manner.

In response to receipt of selection of the private information at 308, the process continues at 310. Selection of the private information may include selection of only part of the private information or may include selection of all of the private information.

Attributes for display of the private information are identified at 310. The attributes for display of the private information are pre-selected, for example, at the Operating System (OS) level or within the application associated with the information displayed. The attributes may be previously selected by the user and applicable to private information associated with any application or may be previously selected by the user for each application such that the associated attributes may differ for private information in one application compared to private information in another application.

The attributes for display of private information may include direction of movement of the private information, a color of the private information, a shape associated with the private information, an object associated with the private information, and any combination thereof.

The private information is displayed utilizing the identified attributes at 312 and additional information is displayed utilizing alternate attributes that differ from the attributes associated with the private information at 314. The additional information includes dummy or false information. The private information and the dummy information are displayed at the same time such that a person unfamiliar with the attributes associated with the display of the private information is unable to discern the dummy information from the private information.

The dummy information may be information that is fabricated at the electronic device 100. The dummy information may be fabricated based on the format of the private information. Thus, the private information may utilize a similar format to that of the private information. In addition, the content of the dummy information is fabricated based on the private information. For example, dummy information including only numerals may be fabricated when the private information includes only numerals. Alternatively, a mix of alphanumeric and symbolic characters may be utilized in the dummy information when the private information includes a mix of alphanumeric and symbolic characters.

Thus, the private information may move across the touch-sensitive display 118 in a predetermined direction, may be located in a predetermined location on the touch-sensitive display 118, may be displayed in a predetermined color, may be displayed on or near a predetermined shape or object, or any combination of such attributes. The dummy information is displayed utilizing different attributes such that the dummy information may move in another direction, may be located in another location, may be displayed in an alternate color, or displayed on or near another shape or object.

Display of the private information may be discontinued. For example, a received input such as selection of an escape button or option, a particular gesture, or any other suitable input at 316 may return the process to 306. Alternatively, display of the private information may be discontinued after a timeout period time such that display of the private information and the dummy information is discontinued and the process returns to 306 after lapse of a threshold period of time absent an input by the user.

Figure 4:
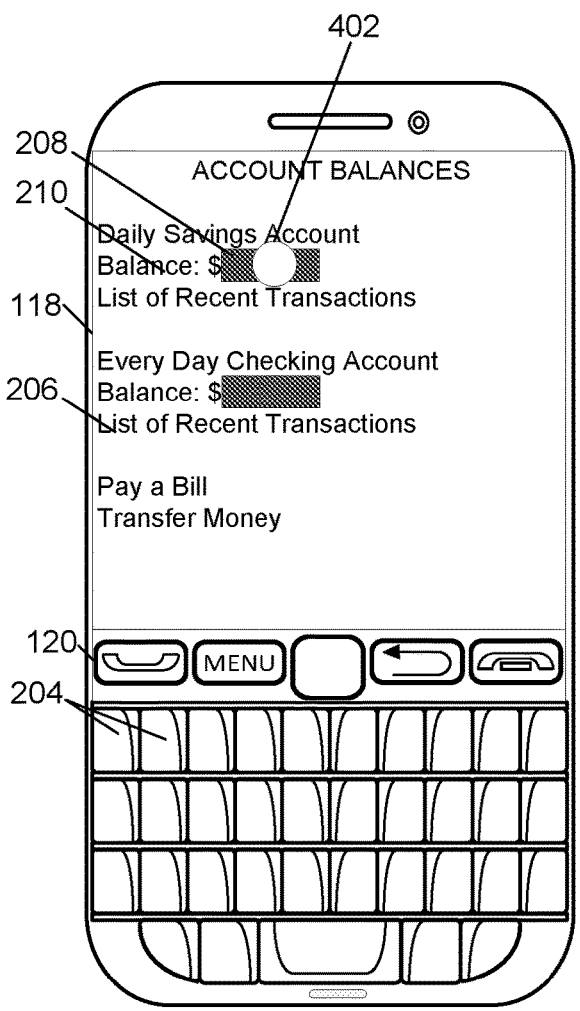
FIG. 4 through FIG. 6 illustrate examples of the method of providing private information in accordance with the disclosure.
Figure 5:
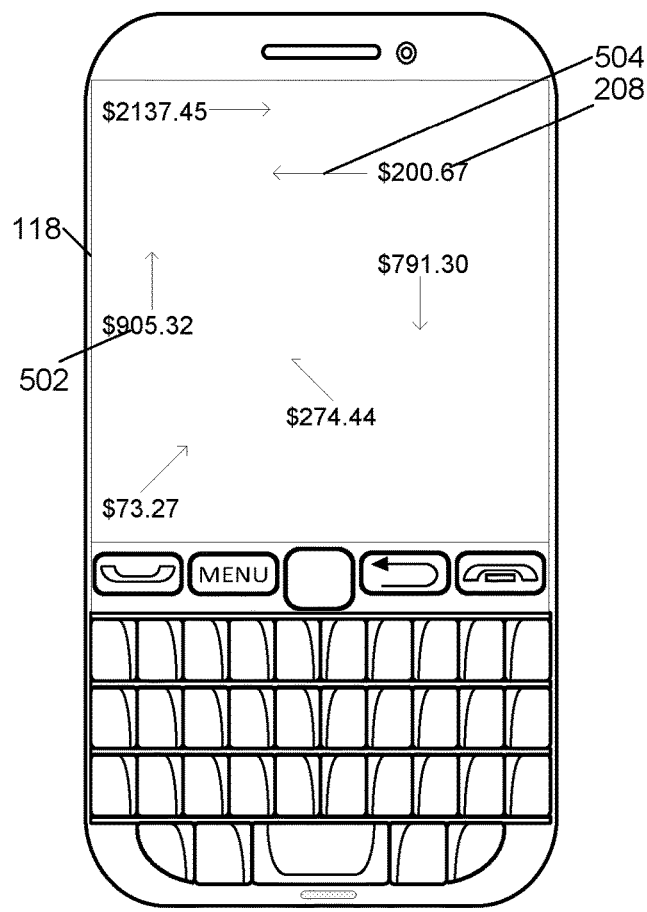
Figure 6:
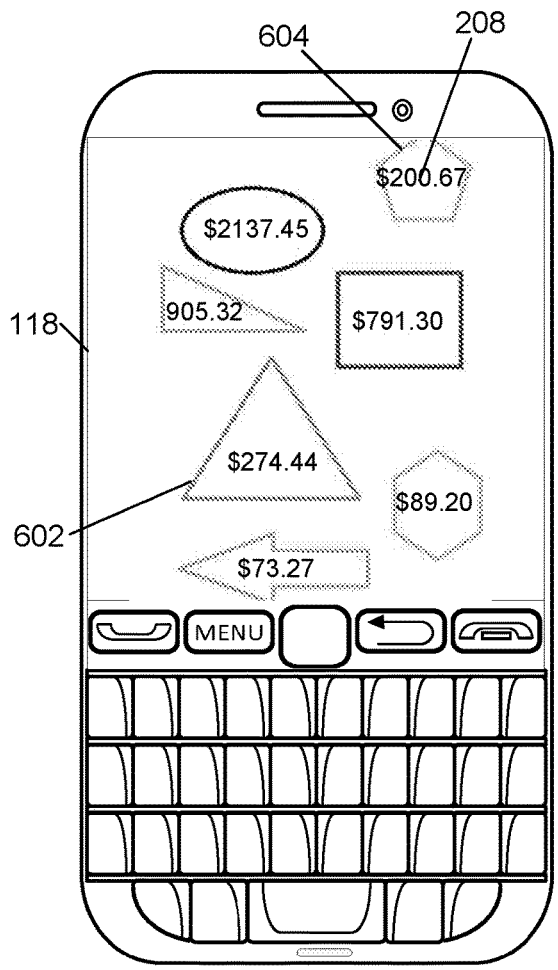

Reference is made again to FIG. 2 with reference to FIG. 4 through FIG. 6 to describe particular examples of the method of providing private information in accordance with the disclosure.

In the example of FIG. 2, FIG. 4 and FIG. 5, the information received 206 utilizing a banking application at 302 includes banking information. The banking information includes bank balance information that is flagged as private information 208, as well as other information 210 for display on the touch-sensitive display 118. A determination is made at 304 that the information received 206 includes the private information 208. The private information 208 is displayed such that the private information 208 is unreadable. In this example, the private information is blacked out such that the private information 208 is not discernible by the user or any other person viewing the touch-sensitive display 118. The private information 208 is selected by a touch on the unreadable private information 208 on the touch-sensitive display 118, as depicted by the circle 402 on the unreadable private information 208.

The attributes associated with private information are identified at 310. For the purpose of the present example, the attributes include a direction of movement of the private information and the private information is preselected to move from left to right across the touch-sensitive display 118, as illustrated by the arrow 504. The private information 208 is displayed at 312 along with dummy information 502 that is fabricated at the electronic device 100. The dummy information 502 in the present example, is fabricated such that, like the private information 208, the dummy information 502 is displayed in dollar amounts. The dummy information 502, however, is displayed utilizing different display attributes. Thus, the dummy information 502 in the present example does not move left to right and, instead, moves in another direction, or does not move. In the example illustrated in FIG. 5, the amount $200.67 is the private information 208 and is identifiable by the user of the electronic device 100 as the private information based on the preselected attribute of movement from left to right.

Continuing with the example of the banking information for the purpose of illustrating other attributes, the attributes associated with the private information include a shape or object in FIG. 6. For example, private information 208 may be the information displayed in the pentagon 604 in the upper right area of the display. The private information 208 may be displayed in a pentagon 604 and dummy information 602 is displayed in other shapes. The private information 208 is displayed at 312 along with dummy information 602 that is fabricated at the electronic device 100. As described with reference to FIG. 5, the dummy information 602 is fabricated such that, like the private information 208, the dummy information 602 is displayed in dollar amounts. The dummy information 602, however, is displayed utilizing different display attributes. Thus, the dummy information 602 in the present example is not displayed in a pentagon and, instead, is displayed in other shapes, such as an ellipse, triangles, a hexagon and an arrow, as illustrated. In the Example illustrated in FIG. 6, the amount $200.67 is the private information 208 and is identifiable by the user of the electronic device 100 as the private information based on the preselected attribute of display in a pentagon.

Advantageously, private information is unreadable when initially displayed. The private information, however, is selectable for the display. The private information is displayed unobscured along with additional, dummy information. The private information is displayed utilizing attributes that are preselected by the user to enable the user to identify the private information displayed with the dummy information. Others viewing the screen, however, are unable to distinguish the private information from the dummy information.

The scope of the claims should not be limited by the preferred embodiments set forth in the examples, but should be given the broadest interpretation consistent with the description as a whole.

What is claimed is:

1. A method of providing private information on a display of an electronic device, the method comprising:
   identifying private information for display on the display of the electronic device;
   identifying one or more attributes for display of the private information;
   displaying the private information utilizing the one or more attributes identified; and
   during displaying the private information utilizing the one or more attributes identified, displaying additional information utilizing one or more alternate attributes that differ from the one or more attributes identified for the private information;
   wherein displaying the additional information comprises displaying dummy information.

2. The method according to claim 1, comprising receiving a selection to display the private information and wherein displaying the private information and displaying the additional information is carried out in response to receiving the selection to display the private information.

3. The method according to claim 1, comprising receiving first information, including the private information, for display on the display.

4. The method according to claim 3, comprising identifying the private information and displaying the first information with the private information obscured such that the private information is unreadable.

5. The method according to claim 4, wherein displaying the first information with the private information comprises covering the private information such that the private information is unreadable.

6. The method according to claim 4, wherein the obscured private information is selectable.

7. The method according to claim 6, wherein displaying the private information and displaying the additional information are carried out in response to selection of the obscured private information.

8. The method according to claim 1, wherein the dummy information comprises dummy information fabricated by the electronic device.

9. The method according to claim 8, comprising identifying a format of the private information and wherein the dummy information is fabricated based on the format of the private information.

10. The method according to claim 1, wherein identifying one or more attributes for display of the private information comprises identifying one or more user-selected attributes of the private information.

11. The method according to claim 1, wherein the one or more attributes comprise one of a direction of movement of the private information, a color of the private information, a shape associated with the private information, an object associated with the private information, or any combination thereof.

12. A non-transitory computer-readable medium having computer-readable code stored thereon, the computer-readable code executable by at least one processor of an electronic device to:
   identify private information for display on the display of the electronic device;
   identify one or more attributes for display of the private information;
   display the private information utilizing the one or more attributes identified; and
   during display of the private information utilizing the one or more attributes identified, display additional information utilizing one or more alternate attributes that differ from the one or more attributes identified for the private information;

wherein display of the additional information comprises display of dummy information.

13. An electronic device comprising:
a display for displaying information;
a processor operably coupled to the display to control the display and:
identify private information for display on the display of the electronic device;
identify one or more attributes for display of the private information;
display the private information utilizing the one or more attributes identified; and
during display of the private information utilizing the one or more attributes identified, display additional information utilizing one or more alternate attributes that differ from the one or more attributes identified for the private information;
wherein display of the additional information comprises display of dummy information.

14. The electronic device according to claim 13, wherein the processor is operable to receive first information including the private information, identify the private information and display the first information with the private information obscured such that the private information is unreadable.

15. The electronic device according to claim 14, comprising an input device for selecting the obscured private information and displaying the private information and displaying the additional information are carried out in response to receipt of a selection of the obscured private information.

16. The electronic device according to claim 13, wherein the dummy information comprises dummy information fabricated by the electronic device, based on a format of the private information.

17. The electronic device according to claim 13, wherein the one or more attributes for display of the private information comprise one or more user-selected attributes of the private information.

18. The electronic device according to claim 13, wherein the one or more attributes comprise one of a direction of movement of the private information, a color of the private information, a shape associated with the private information, an object associated with the private information, or any combination thereof.

* * * * *